Nov. 15, 1966
L. C. ARGYLE
3,286,173
APPARATUS FOR MEASURING MISALIGNMENT BETWEEN
A PLURALITY OF MOVING PARTS
Filed Sept. 12, 1962
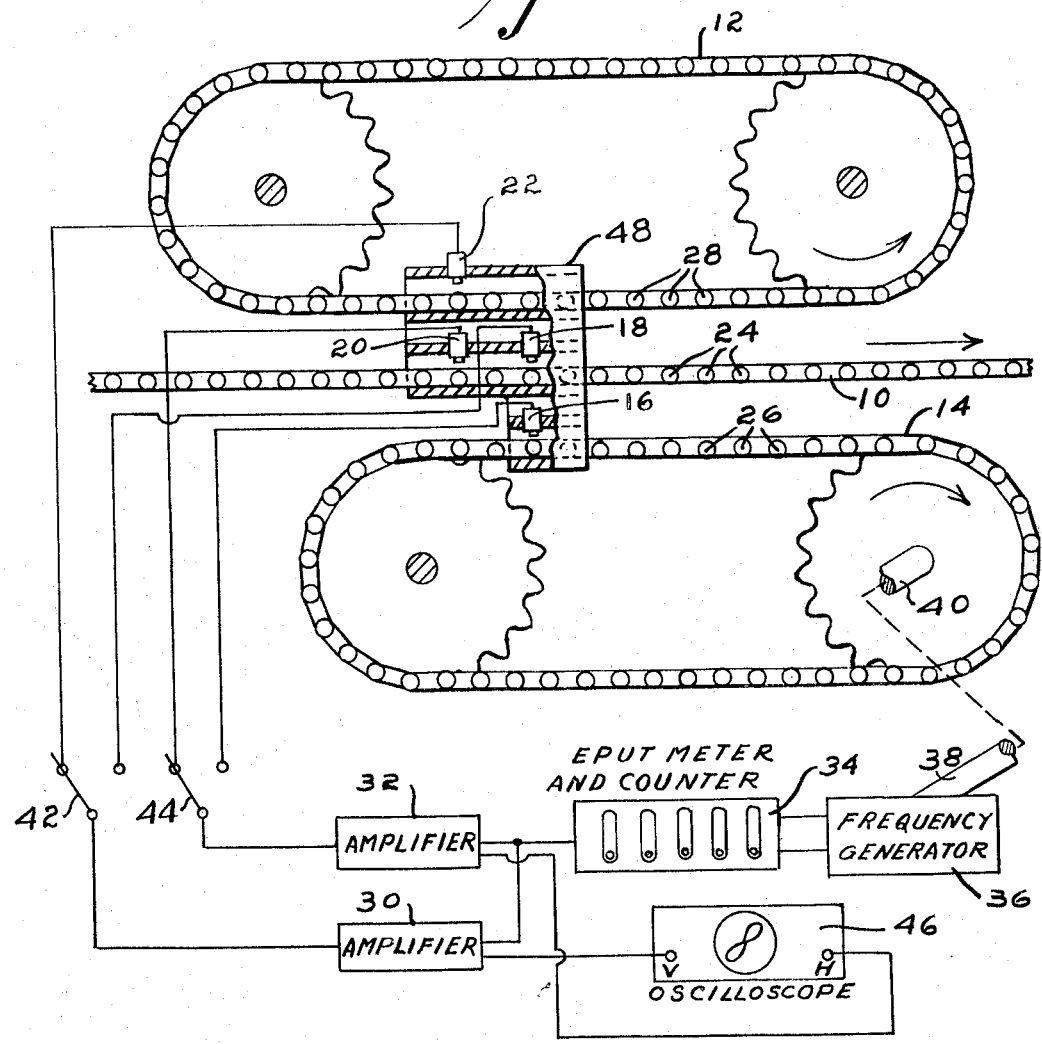
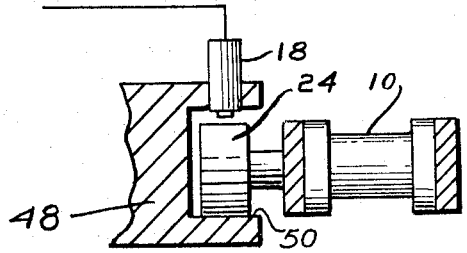
INVENTOR.
LEROY C. ARGYLE
BY Clarence R. Patty, Jr.
ATTORNEY ns Patent Office
3,286,173
Patented Nov. 15, 1966

3,286,173
APPARATUS FOR MEASURING MISALIGNMENT BETWEEN A PLURALITY OF MOVING PARTS
Leroy C. Argyle, Elmira, N.Y., assignor to Corning Glass Works, Corning, N.Y., a corporation of New York
Filed Sept. 12, 1962, Ser. No. 223,141
4 Claims. (Cl. 324—68)

This invention relates to an apparatus and method for measuring and indicating the interval of time between the occurrence of a plurality of events at a plurality of locations and more particularly to an apparatus and method for sensing and indicating the amount of misalignment between a plurality of moving parts, but is in no way limited to such applications.

Machines, such for example as the glass working machine of Woods et al., Patent No. 1,790,397, have various moving parts such as chains, belts, conveyors and the like, which parts must be in proper alignment with one another for proper machine performance. In the past such alignment was brought about by, for example, trial and error methods based on sampling of the product of such machines.

The object of this invention is to provide a means for rapidly and accurately measuring and indicating the amount of misalignment between a plurality of moving parts.

Another object of this invention is to provide means for measuring misalignment of moving parts which is independent of the velocity of said parts.

A further object is to measure the interval of time between the occurrence of a plurality of events at a plurality of locations.

According to this invention an apparatus is provided for producing signals in response to each of a plurality of events at a plurality of locations, and measuring the interval of time between said events, which interval of time is a function of the displacement between the means causing said signals, said apparatus comprising a plurality of pick-up devices, means for actuating said devices in response to events occurring at said locations thereby producing said signals, and means responsive to said signals for measuring said interval of time between said signals, said interval of time corresponding to the displacement between said actuating means.

Additional objects, features, and advantages of the present invention will become apparent, to those skilled in the art, from the following detailed description and the attached drawing on which, by way of example, only the preferred embodiment of this invention is described.

FIG. 1 is a diagrammatic illustration and an electrical block diagram of an apparatus embodying the instant invention.

FIG. 2 is a cross sectional elevation of a pick-up actuating device.

For the purposes of simplicity, the present invention will be described in connection with the moving belts, chains or conveyors of the glass working machine described in the heretofore noted Woods et al. patent although, obviously, the machine itself does not form part of the invention. The operation of the machine, as well as its structural details are clearly described in great detail in said Woods et al. patent, however, for the purposes of completeness the operation of said machine will be briefly described herein. Referring to FIG. 1, such a glass working machine has a glass ribbon conveyor 10 upon which a molten glass ribbon is deposited by means not shown. A portion of the glass ribbon is caused to sag or droop through openings in said conveyor 10, and is then expanded by blowing. Blowheads are mounted on the blowhead chain 12, corresponding to said openings in conveyor 10. The glass is blown into molds mounted on mold chain 14, which molds are also positioned to correspond to the openings of conveyor 10. It is readily seen by one familiar with the art that conveyor 10, chain 12 and chain 14 must not only have a common velocity but also must be properly aligned to provide proper machine performance. To make certain that the various moving parts will have a common velocity, such machines are operated by a single drive in a manner well known in the art.

Magnetic pick-ups 16, 18, 20 and 22 provide a signal upon the occurrence of an event in a manner well known by one familiar with the art. The event may be the passing of some portion of the conveyor or chain, which portion is regularly spaced thereon, or the passing of a triggering device mounted thereto, or the like. All that is necessary is that the pick-up means be actuated when a desired event of whatever nature occurs. It will be readily understood that the pick-up means may also take the form of photoelectric cells, or capacitive devices sensitive to changes in magnetic or dielectric paths or other such devices. An example of the pick-up actuating means is conveyor rollers 24, which in passing the sensing head of pick-up 18 cause a signal to be transmitted to amplifier 30 in a manner well known by one familiar with the art. Likewise, chain rollers 26 in passing the sensing head of pick-up 16 cause a signal to be transmitted to amplifier 32. Obviously, in the same manner conveyor rollers 24 will cause pick-up 20 to transmit a signal to amplifier 32 while chain roller 28 will cause pick-up 22 to transmit a signal to amplifier 30 when the circuit is properly engaged by suitable switching means as hereinafter described. Amplifiers 30 and 32 provide signals for electronic counter and time interval meter 34 in a manner well known by one familiar with the art. Electronic counters and time interval meters such as eput (events per unit time) meters are well known in the art.

The first occurring signal, provided by either pick-up 16 or 18 as a result of being actuated first in time, is transmitted through the respective amplifier, and actuates electronic counter and time interval meter 34, thereby causing said meter 34 to measure time. The second occurring signal, provided by the other pick-up as a result of being actuated second in time is transmitted through its respective amplifier and stops the measurement of time by meter 34. Thus the time between the two signals has been measured and is displayed on the electronic counter. Electronic counters and time interval meters measure time as a function of the reference frequency supplied to such meters.

It has been discovered that providing a reference frequency for counter and meter 34 which varies as a function of the speed of the moving belts, chains, and conveyors, permits said counter and meter to directly sense and display the distance between the two signal triggering means or a function thereof. The reference frequency for the counter and meter 34 is provided by frequency generator 36, which generator is driven by the same drive as the moving parts, such as by connecting frequency generator shaft 38 to the machine drive illustrated by shaft 40. For example, if the frequency generator 36 is selected so that it will generate 1000 cycles per inch of linear travel of the belts, chains, or conveyors, counter and meter 34 will display the number of thousandths of an inch of displacement or misalignment between the actuating devices causing the first and second signals received by the counter and meter, since each count or cycle will correspond to 0.0001 of an inch of belt, chain, or conveyor travel. Therefore, in this example, if pickups 16 and 18 are so disposed that they will be triggered or actuated simultaneously when conveyor 10 and chain 14 are in proper alignment, the number displayed on said counter will be the number of thousandths of an inch of misalignment between conveyor 10 and chain 14. Conveyor 10 and chain 14 may then be aligned by means well known in the art in accordance with said counter reading.

FIG. 1 further illustrates that by providing suitable switching means such as switches 42 and 44, conveyor 10 may be aligned with chain 14 and thereafter chain 12 may be aligned with conveyor 10, resulting in all three being aligned with each other. When desired, an oscilloscope 46 may be provided for visual indication of the direction and degree of misalignment of the various parts. This is accomplished by electrically connecting one pick-up to the horizontal input of said oscilloscope and another pick-up to the vertical input thereof. A lissajous pattern is thereby produced on said oscilloscope, the deviation from a substantially symmetrical shape thereof being a function of the direction and degree of misalignment of the various parts.

FIG. 2 illustrates a magnetic pick-up 18, mounted in structure 48, which structure provides a track 50 upon which roller 24 of conveyor 10 rides. As roller 24 passes under pick-up 18, a signal is produced and transmitted by said pick-up as heretofore described.

It is readily seen that when the belts or conveyors triggering the pick-ups are in desired alignment with each other, the time between the first and second signal will be zero, therefore said counter and meter will be caused to display a reading indicating zero misalignment.

Although the present invention has been described with respect to specific details of certain embodiments thereof, it is not intended that such details be limitations upon the scope of the invention except insofar as set forth in the following claims.

What is claimed is:

1. An apparatus for sensing misalignment between two parts comprising driving means for moving said parts along predetermined fixed paths at a substantially common velocity, first actuating means affixed to the first of said parts, second actuating means affixed to the second of said parts, first pick-up means for producing a first electrical signal in response to said first actuating means upon translation of said first of said parts to a predetermined position along its path, second pick-up means for producing a second electrical signal in response to said second actuating means upon translation of said second of said parts to a predetermined position along its path, means operatively responsive to said driving means for producing a variable electrical reference frequency corresponding to said common velocity, and timing means operatively responsive to said reference frequency actuated by the signal occurring first in time of said first and second electrical signals and stopped by the signal occurring second in time of said first and second electrical signals for measuring the interval of time between said signals, said interval of time corresponding to the misalignment between said parts.

2. The apparatus of claim 1 wherein said pick-up means are magnetic pick-ups.

3. In an apparatus for sensing misalignment between two moving parts, driving means for moving said parts at a substantially common velocity along predetermined fixed paths, first actuating means operatively associated with the first of said parts, second actuating means operatively associated with the second of said parts, first pick-up means for producing a first electrical signal in response to said first actuating means upon translation of said first of said parts to a predetermined position along its path, second pick-up means for producing a second electrical signal in response to said second actuating means upon translation of said second of said parts to a predetermined position along its path, a frequency generator operatively responsive to said driving means for providing a variable electrical reference frequency corresponding to said common velocity, and counting means actuated by the signal occurring first in time of said first and second electrical signals and stopped by the signal occurring second in time of said first and second electrical signals for measuring the number of cycles produced by said generator during the interval of time between said signals, said counting means being operatively responsive to said reference frequency whereby said number of cycles corresponds to the misalignment between said moving parts.

4. An apparatus for sensing misalignment between said moving parts comprising driving means for moving said parts at a substantially common velocity along predetermined fixed paths, first pick-up means for producing a first electrical signal upon being actuated, means operatively associated with the first of said parts for actuating said first pick-up means upon translation of said first of said parts to a predetermined position along its path, second pick-up means for producing a second electrical signal upon being actuated, means operatively associated with the second of said parts for actuating said second pick-up means upon translation of said second of said parts to a predetermined position along its path, frequency generating means driven by said driving means for producing a variable electrical reference frequency corresponding to said common velocity, and counting means actuated by the signal occurring first in time of said first and second electrical signals and stopped by the signal occurring second in time of said first and second electrical signals for counting the number of cycles produced by said frequency generating means during the interval of time between said signals, said counting means being coupled to said frequency generating means and being operatively responsive to said reference frequency whereby said number of cycles corresponds to the misalignment between said moving parts.

References Cited by the Examiner

UNITED STATES PATENTS

| | | | |
|---|---|---|---|
| 2,230,715 | 2/1941 | Cockrell. | |
| 2,941,086 | 6/1960 | Gottschall | 250—219 |
| 2,989,690 | 6/1961 | Cook | 324—34 |
| 3,041,703 | 7/1962 | Prell | 26—51.5 |

WALTER L. CARLSON, *Primary Examiner.*

FREDERICK M. STRADER, *Examiner.*

C. W. HOFFMANN, M. J. LYNCH, *Assistant Examiners.*

UNITED STATES PATENT OFFICE
CERTIFICATE OF CORRECTION

Patent No. 3,286,173                                           November 15, 1966

Leroy C. Argyle

It is hereby certified that error appears in the above numbered patent requiring correction and that the said Letters Patent should read as corrected below.

Column 2, line 3, for "of" read -- in --; line 68, for "0.0001" read -- 0.001 --.

Signed and sealed this 12th day of September 1967.

(SEAL)
Attest:

ERNEST W. SWIDER                                    EDWARD J. BRENNER
Attesting Officer                                           Commissioner of Patents